(12) United States Patent
DeLong et al.

(10) Patent No.: US 7,105,778 B1
(45) Date of Patent: Sep. 12, 2006

(54) COMBINATION TOASTER OVEN AND TOASTER APPLIANCE

(75) Inventors: Derwood S. DeLong, Goochland, VA (US); Michael Garman, Stafford, VA (US); Jim Gaynor, Richmond, VA (US)

(73) Assignee: Hamilton Beach/Proctor-Silex, Inc, Glen Allen, VA (US)

( * ) Notice: Subject to any disclaimer, the term of this patent is extended or adjusted under 35 U.S.C. 154(b) by 0 days.

(21) Appl. No.: 11/286,865

(22) Filed: Nov. 23, 2005

(51) Int. Cl.
*A47J 37/08* (2006.01)

(52) U.S. Cl. ............... 219/386; 219/392; 219/408; 99/357; 99/339; 99/340

(58) Field of Classification Search .......... None
See application file for complete search history.

(56) References Cited

U.S. PATENT DOCUMENTS

| | | | |
|---|---|---|---|
| 1,587,023 A | 6/1926 | Mottlau | |
| 1,864,049 A | 6/1932 | Mulvany | |
| 2,237,705 A | 4/1941 | Kohl | |
| 2,509,989 A | 5/1950 | Pearce | |
| 2,720,568 A | 10/1955 | Bletz | |
| 2,791,662 A | 5/1957 | Mertler | |
| 2,847,553 A | 8/1958 | Smith | |
| 2,862,441 A | 12/1958 | Schmall | |
| D186,419 S | 10/1959 | Keefe | |
| 2,920,551 A | 1/1960 | Schmall | |
| 2,924,700 A | 2/1960 | Huffman | |
| 3,077,531 A | 2/1963 | Wompey | |
| 3,152,243 A | 10/1964 | Andrews | |
| 3,207,876 A | 9/1965 | Mertler | |
| 3,416,430 A * | 12/1968 | Hauser | 99/332 |
| D223,066 S | 3/1972 | Hanson et al. | |
| 3,699,004 A | 10/1972 | Eaton, Jr. et al. | |
| 3,732,803 A | 5/1973 | Buxmann | |
| 3,760,713 A | 9/1973 | Sato | |
| 3,800,691 A * | 4/1974 | Eaton et al. | 99/391 |
| D237,242 S | 10/1975 | Claxton | |
| 4,166,994 A | 9/1979 | DeRemer | |
| 4,206,344 A | 6/1980 | Fischer | |
| 4,382,175 A | 5/1983 | Huggler | |
| 4,397,227 A | 8/1983 | Landry | |
| 4,404,899 A | 9/1983 | Weiss | |
| RE31,595 E | 6/1984 | Fischer et al. | |
| 4,455,479 A | 6/1984 | Itoh et al. | |
| 4,476,453 A | 10/1984 | Hollweck | |
| 4,495,481 A | 1/1985 | Hickling | |
| 4,517,452 A | 5/1985 | Krasznai | |
| 4,682,141 A | 7/1987 | Hickling | |
| 4,720,696 A | 1/1988 | Oldani | |
| 4,746,785 A | 5/1988 | De Longhi | |

(Continued)

Primary Examiner—Joseph Pelham
(74) Attorney, Agent, or Firm—Akin Gump Strauss Hauer & Feld, LLP (57) ABSTRACT

A combination toaster oven and toaster appliance for cooking and heating foodstuff including a housing defining a food cavity therein and a heating element mounted in the housing for heating the food cavity. The housing includes a top wall and a front wall. A slot is located in the top wall and a door is movably mounted to the front wall. A toaster oven opening is located in the front wall and provides access to the food cavity. The door is movable between a closed position wherein the door covers the toaster oven opening and an open position wherein the door exposes the toaster oven opening and food cavity. A slot cover is movable between an extended position covering the slot and a retracted position exposing the slot.

21 Claims, 10 Drawing Sheets

U.S. PATENT DOCUMENTS

| | | | |
|---|---|---|---|
| 4,751,491 A | 6/1988 | Cors | |
| 4,835,367 A | 5/1989 | Hoffman | |
| 4,889,042 A | 12/1989 | Hantz et al. | |
| 4,968,963 A | 11/1990 | DeWitt | |
| 4,993,144 A | 2/1991 | Llewellyn | |
| 5,212,465 A | 5/1993 | Mizutani | |
| 5,216,944 A | 6/1993 | Trujillo | |
| 5,390,588 A | 2/1995 | Kraznai et al. | |
| 5,423,246 A | 6/1995 | McNair et al. | |
| 5,458,052 A | 10/1995 | McNair et al. | |
| 5,471,914 A | 12/1995 | Kraznai et al. | |
| 5,548,266 A | 8/1996 | Murphy | |
| 5,642,657 A | 7/1997 | Yeung et al. | |
| 5,664,481 A | 9/1997 | Huggler | |
| 5,694,831 A * | 12/1997 | Haroun et al. | 99/339 |
| 5,696,479 A | 12/1997 | Oughton et al. | |
| 5,746,115 A | 5/1998 | Yip | |
| 5,758,567 A | 6/1998 | Van Der Wal | |
| 5,889,259 A | 3/1999 | Krasznai | |
| 5,960,702 A | 10/1999 | Thiriat et al. | |
| 5,973,586 A | 10/1999 | Mertler, Jr. | |
| 6,080,967 A | 6/2000 | Sandor | |
| D427,838 S | 7/2000 | Lee | |
| D442,817 S | 5/2001 | Demore | |
| 6,337,466 B1 | 1/2002 | Chasen | |
| D453,281 S | 2/2002 | Plumtre et al. | |
| 6,382,084 B1 | 5/2002 | Chan | |
| D465,690 S | 11/2002 | Ancona et al. | |
| 6,530,309 B1 | 3/2003 | Van Der Meer et al. | |
| 6,640,697 B1 | 11/2003 | Pavlovic et al. | |
| 6,657,168 B1 | 12/2003 | Lazzer | |
| 6,717,110 B1 | 4/2004 | Van der Meer et al. | |
| 6,799,505 B1 | 10/2004 | Mauffrey | |
| 6,829,983 B1 | 12/2004 | Arnedo | |
| 2003/0116030 A1 | 6/2003 | Wang | |
| 2004/0107955 A1 | 6/2004 | Schnell | |
| 2004/0144380 A1 | 7/2004 | Grutzke | |
| 2005/0006375 A1 | 1/2005 | Naranjo | |

* cited by examiner

COMBINATION TOASTER OVEN AND TOASTER APPLIANCE

BACKGROUND OF THE INVENTION

Conventional household toasters and toaster ovens are common in the kitchen appliance art for toasting a foodstuff such as a slice of bread or a bagel and/or baking or heating a foodstuff such as a personal pizza or baked potato. The toaster and toaster oven are typically two separate units that each take up counter space in a kitchen. A combination toaster oven and toaster appliance has been developed which combines the toaster oven with the toaster in a single appliance. The combination toaster oven and toaster includes the pivotable front door of a conventional toaster oven and the toasting carriage and slot of a conventional toaster.

A prior art combination toaster oven and toaster appliance included a toaster slot at its top that was constantly open such that heat was able to flow out of the open, exposed toaster slot, severely compromising the efficiency of the toaster oven. In addition, any object that was dropped onto the top of the combination toaster oven and toaster appliance or into the slot during use of the toaster oven may be exposed to the high temperatures of the toaster oven and could potentially catch fire. If an item were to catch on fire in the prior art combination toaster oven and toaster appliance or the foodstuff being toasted in the toaster oven were to catch fire, the flames were able to leap out of the toaster slot and cause a burning hazard to a user or a general fire hazard to anything in close proximity to the exposed slot. Further, the user could set the toaster oven for baking at a predetermined baking temperature for an indeterminate or infinite amount of time and leave the combination toaster oven and toaster appliance unsupervised during the cooking cycle. Accordingly, the indefinitely timed or infinite cooking cycle was able to proceed at a high temperature without user supervision. This is undesirable in that a user may forget that the appliance is operating and electricity may be wasted or a fire may commence. Specifically, the prior art combination toaster oven and toaster appliance is typically a counter top appliance that may be positioned under kitchen cabinets during use, causing a fire hazard if flames extend out of an open toaster slot.

It would be advantageous to develop an appliance with the advantages of the prior art combination toaster oven and toaster appliance that prevented use of the toaster oven with an exposed slot. In addition, it would be desirable to design a combination toaster oven and toaster appliance that prevented an indefinite cooking cycle unless the toast slot was covered. In addition, it would be desirable for this appliance to include a toasting slot such that the appliance may be used as a toaster oven and a toaster such that kitchen countertop space is preserved.

BRIEF SUMMARY OF THE INVENTION

Briefly stated, a preferred embodiment of the present invention is directed to a combination toaster oven and toaster appliance for cooking and heating foodstuff. The combination toaster oven and toaster appliance includes a housing defining a food cavity therein. The housing includes a top wall and a front wall. A heating element is mounted in the housing for heating the food cavity and a slot is located in the top wall. A door is movably mounted to the front wall and a toaster oven opening is positioned in the front wall for providing access to the food cavity. The door is movable between a closed position wherein the door covers the toaster oven opening and an open position wherein the door exposes the toaster oven opening and food cavity. A slot cover is movable between an extended position covering the slot and a retracted position exposing the slot.

In another aspect, a preferred embodiment of the present invention is directed to a combination toaster oven and toaster appliance for cooking and heating foodstuff. The combination toaster oven and toaster appliance includes a housing having a top wall, a front wall and a food cavity therein. A slot is located in the top wall. A slot cover is movable between an extended position covering the slot and a retracted position exposing the slot. A toaster oven opening is located in the front wall and provides access to the food cavity. A movable arm is mounted to and extends from the housing. The arm is movable between an oven position and a toast position. The arm is linked to the slot cover such that the slot cover is in the extended position when the arm is in the oven position and the slot cover is in the retracted position when the arm is in the toast position.

In yet another aspect, a preferred embodiment of the present invention is directed to a control system for a combination toaster oven and toaster appliance. The combination toaster oven and toaster appliance includes a housing having a top wall and a front wall. The housing defines a food cavity and a heating element is mounted in the housing for heating the food cavity. A slot is located in the top wall and a toaster oven opening is located in the front wall. A door is movably mounted to the front wall to selectively close and expose the toaster oven opening. A slot cover is movably mounted to the housing. The slot cover is movable between an extended position covering the slot and a retracted position exposing the slot. A movable arm is mounted to the housing and is movable between an oven position and a toast position. The slot cover is in the extended position when the arm is in the oven position. A carriage is in alignment with the slot and is movable between a loading position and a toast position. A selector switch is mounted to the housing proximate the arm. The selector switch actuates the appliance to a toast mode when the arm is in the toast position and actuates the appliance to an oven mode when the arm is in the oven position.

In a further aspect, a preferred embodiment of the present invention is directed to a combination toaster oven and toaster appliance for cooking and heating foodstuff. The combination toaster oven and toaster appliance includes a housing defining a food cavity therein. The housing includes a top wall, a side wall and a front wall. A heating element is mounted in the housing for heating the food cavity. An arm is movably mounted to the housing and is movable between an oven position and a toast position. A selector switch is mounted to the housing proximate the arm. The selector switch actuates the appliance to an oven mode when the arm is in the oven position and actuates the appliance to a toast mode when the arm is in the toast position. A slot cover is movably mounted to the housing and is linked to the arm. The slot cover is movable between an extended position covering a slot in the top wall and a retracted position exposing the slot. A temperature knob is mounted to the housing and is movable between an off position and a high temperature position. The temperature knob opens an upper branch of an electric circuit of the appliance in the off position and closes the upper branch in the high temperature position.

BRIEF DESCRIPTION OF THE SEVERAL VIEWS OF THE DRAWINGS

The foregoing summary as well as the following detailed description of preferred embodiments of the present invention will be better understood when read in conjunction with the appended drawings. For the purpose of illustrating the invention, there is shown in the drawings embodiments which are presently preferred. It is understood, however, that the invention is not limited to the precise arrangements and instrumentalities shown. In the drawings.

DETAILED DESCRIPTION OF THE INVENTION

Certain terminology is used in the following description for convenience only and is not limiting. The words, "right," "left," "lower" and "upper" designate directions in the drawings to which reference is made. The words "inwardly" and "outwardly" refer to directions toward and away from, respectively, the geometric center of the combination toaster oven and toaster appliance and designated parts thereof. The terminology includes the words above specifically mentioned, derivatives thereof and words of similar import. Additionally, the word "a", as used in the specification, means at least one.

Referring to the drawings in detail wherein like numerals indicate like elements throughout, there is shown in FIGS. 1–7, a first preferred embodiment of a combination toaster oven and toaster appliance, generally designated 10, for cooking, toasting, baking, defrosting or otherwise heating a foodstuff. The combination toaster oven and toaster appliance 10 combines a conventional toaster oven and a conventional toaster into a single appliance that takes up less space on a kitchen countertop than the conventional two separate appliances.

Figure 1:
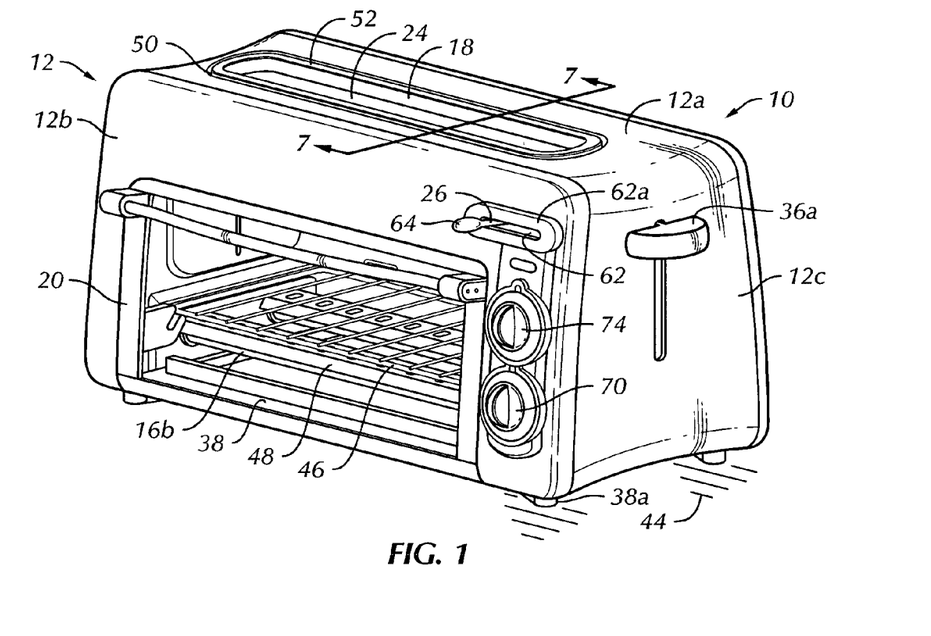
FIG. 1 is front perspective view of a combination toaster oven and toaster appliance in accordance with a preferred embodiment of the present invention.
Figure 2:
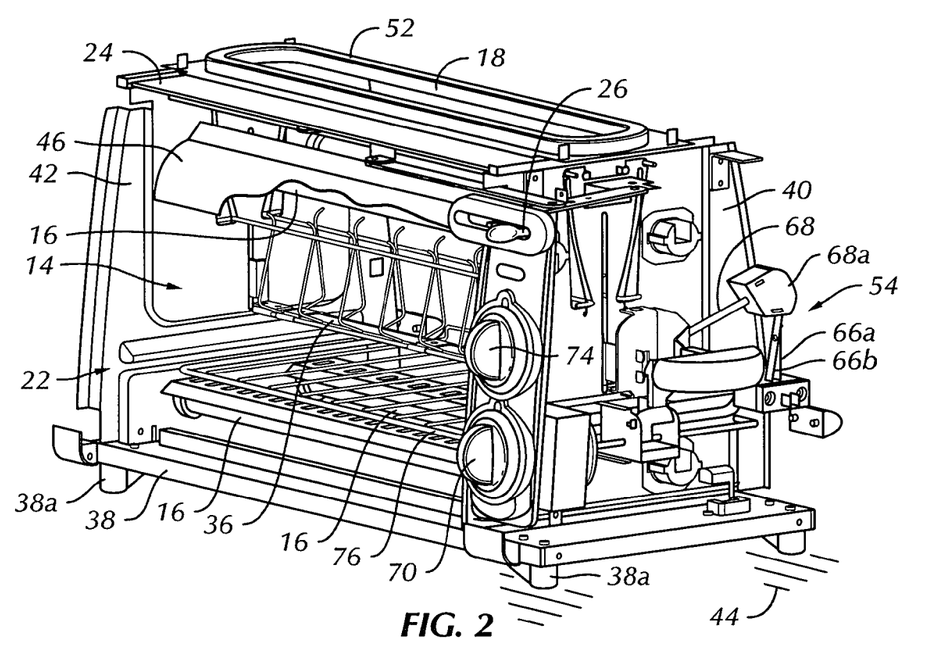
FIG. 2 is a front perspective, partial-fragmentary view of the combination toaster oven and toaster appliance of FIG. 1 having portions of a housing and other components removed from view and a carriage in a toast position.

Referring to FIGS. 1 and 2, in the first preferred embodiment, the combination toaster oven and toaster appliance 10 includes a housing 12 defining a food cavity 14 therein. The housing 12 includes a top wall 12a and a front wall 12b. The housing 12 also includes a left-side wall 12c and a right-side wall (not shown). The housing 12 is preferably constructed of a generally rigid, sheet material that is resistant to heat and fire, such as a metallic sheet material, but is not so limited.

The housing 12 preferably includes a base support 38, a left support board 40 and a right support board 42. The housing 12 is preferably supported above a support surface 44 by feet 38a that extend generally perpendicularly from the base support 38. The base support 38 is preferably positioned generally parallel to the support surface 44 and the left and right support boards 40, 42 preferably extend generally perpendicularly and upwardly from the base support 38. The left and right support boards 40, 42 are preferably located within the top, front and side walls 12a, 12b, 12c in an assembled configuration. The base support 38 and left and right support boards 40, 42 are preferably constructed of a generally rigid, sheet material that is resistant to high temperatures. For example, the base support 38 and the left and right support boards 40, 42 may be constructed of sheet metal material, but are not so limited and may be constructed of nearly any material that is able to take on the general shape of these components and withstand the normal operating conditions of these components.

Referring to FIGS. 1, 2 and 5–7, in the first preferred embodiment, the combination toaster oven and toaster appliance 10 includes a heating element 16 mounted in the housing 12 for heating the food cavity 14. The heating element 16 is preferably comprised of a lamp-type heating element that is generally well known in the art but is not so limited. The heating element 16 may be comprised of nearly any type of heating device that is able to heat the food cavity 14 and toast, cook or otherwise heat the foodstuff therein while permitting access to the food cavity 14. However, the lamp-type heating elements 16 are preferred because of their relatively compact size such that a user is able to access the food cavity 14 through an opening for inserting and removing a foodstuff from the food cavity 14.

The heating element 16 is preferably comprised of a first pair of upper heating tubes 16a and a second pair of lower heating tubes 16b. The upper and lower heating tubes 16a, 16b are preferably mounted within the housing 12 and extend across the food cavity 14 between the left and right support boards 40, 42. Specifically, the heating tubes 16a, 16b are preferably located at corners of the food cavity 14 and typically heat the entire food cavity 14. Referring specifically to FIGS. 1 and 2, the upper heating tubes 16a are preferably associated with a pair of reflector shields 46 that reflect radiation heat energy from the upper heating tubes 16a toward a central portion of the food cavity 14. The lower heating tubes 16b are preferably associated with a pair of shields or shield boards 48 that are positioned between the lower heating tubes 16b and the central portion of the food cavity 14. The shield boards 48 include holes therein to permit radiation heat energy from the lower heating tubes 16b to travel toward the central portion of the food cavity 14 and heat any foodstuff that is in the food cavity 14. The shield boards 48 also generally deflect relatively large pieces of foodstuff or crumbs from coming into direct contact with the lower heating tubes 16b. It is preferred that foodstuff does not come into direct contact with the heating tubes 16a, 16b as direct contact may cause overheating of the foodstuff or a potential fire hazard. The combination toaster oven and toaster appliance 10 is not limited to the inclusion of the reflector shields 46 or the shield boards 48 but these structures are preferred to permit radiation heat energy to be directed toward the central portion of the food cavity 14 and to protect the foodstuff from coming into direct contact with the heating elements 16a, 16b, respectively.

Figure 7:
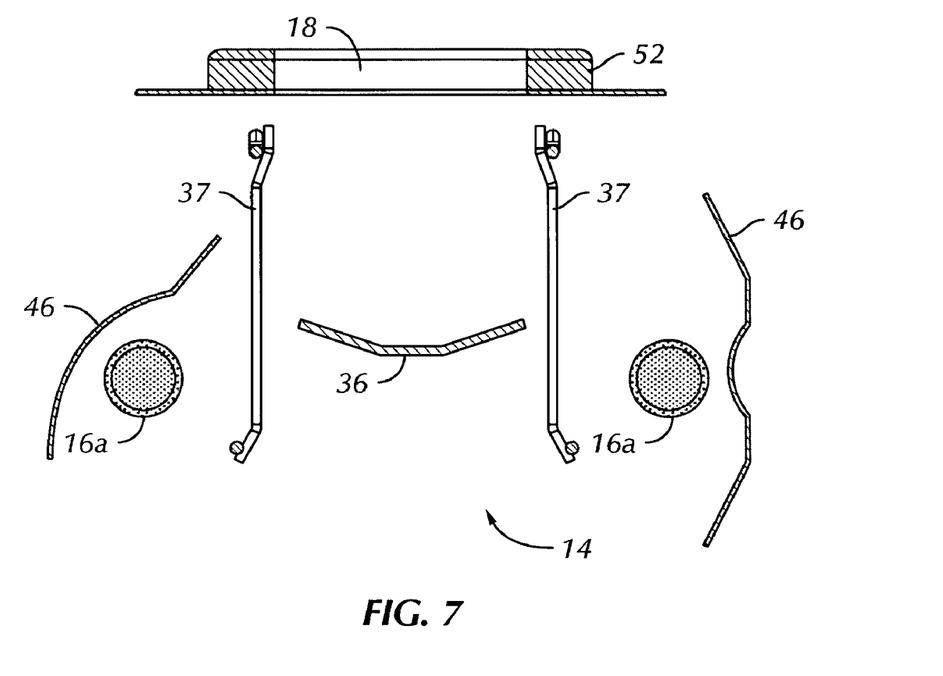
FIG. 7 is a partial cross-sectional view of the combination toaster oven and toaster appliance of FIG. 1, taken along line 7—7 of FIG. 1.

Referring to FIG. 7, the reflector shields 46 preferably have a curved or arcuate shape that directs radiation heat energy from the upper heating tubes 16a toward a central portion of the food cavity 14. In the first preferred embodiment, a front reflector shield 46 is slightly shorter than a rear reflector shield 46 such that the front reflector shield 46 does not interfere with the insertion of foodstuff into a toaster oven opening 22, as will be described in greater detail below. In addition, the front reflector shield 46 has a different curvature than the rear reflector shield 46.

Referring to FIGS. 1–4 and 7, at least one slot or toast slot 18 is located in the top wall 12a of the housing 12. The slot 18 is typically utilized for receipt of a slice of bread, a bagel or other pastry for toasting, cooking or heating. In the preferred embodiments, the slot 18 is defined by a hole 50 in the top wall 12a and a slot former 52 that is mounted to a top of the left and right support boards 40, 42 and extends through the hole 50. The slot 18 will be understood by one having ordinary skill in the art as a typical slot for a toaster and is preferably large enough to accommodate insertion of a slice of bread or other pastry, for example, a bagel, for toasting in the food cavity 14. The slot 18 may have nearly any size and is typically large enough to accept at least a single slice of bread and may be large enough to accept several slices of bread or several bagels or other pastries for toasting or heating in the food cavity 14. The slot 18 is preferably vertically aligned between the upper heating elements 16a and with the food cavity 14 such that a foodstuff inserted into the slot 18 moves into the food cavity 14 between the upper heating elements 16a. The slot 18 may also be comprised of several slots (not shown) in the top wall 12a that may each receive a slice of bread or other foodstuff for insertion into the food cavity 14. The slot 18 may also be located in other portions of the housing 12 besides the top wall 12a.

Referring to FIGS. 2 and 7, in the preferred embodiments, the combination toaster oven and toaster appliance 10 includes at least one carriage or toast carriage 36 that is movably mounted in the housing 12. The carriage 36 preferably spans the food cavity 14 between the left and right support boards 40, 42 and is able to support a slice of bread, multiple slices of bread or other pastries thereon during a toasting/heating cycle. A toast handle 36a is preferably mounted to the carriage 36 and extends outwardly from the left-side wall 12c of the appliance 10. The carriage 36 is preferably aligned with the slot 18 such that a foodstuff inserted into the slot 18 comes into contact with and is loaded onto and supported by the carriage 36. The carriage 36 and toast handle 36a, which is used to move the carriage 36 between an upper or loading position and a lower or toast position, are generally well known in the toasting art by one having ordinary skill in the art. The carriage 36 is preferably biased toward the loading position. The carriage 36 actuates a toast switch 54 in the toast position to commence a timed toasting cycle wherein the heating elements 16a, 16b are powered to heat the food cavity 14, as will be described in greater detail below. The appliance 10 is not limited to the inclusion of a single carriage 36 and may include multiple carriages (not shown) that are associated with several slots (not shown). A pair of support grills 37 is preferably mounted to the housing 12 or to the carriage 36 to laterally support a foodstuff that is positioned on the carriage 36 for heating. The structure and function of the support grills 37 are generally well known to one having ordinary skill in the art.

Referring to FIG. 1, a door 20 is preferably movably mounted to the front wall 12b and the toaster oven opening 22 is located in the front wall 12b proximate the door 20. The opening 22 preferably provides access to the food cavity 14 through the front wall 12b. The door 20 is movable between a closed position wherein the door 20 covers the toaster oven opening 22 and an open position wherein the door 20 exposes the toaster oven opening 22 and the food cavity 14. In the closed position, the door 20 preferably at least partially seals the toaster oven opening 22 to limit the amount of heat that escapes from the food cavity through the toaster oven opening 22. The door 20 is preferably pivotally mounted to the housing 12 proximate a lower front edge of the housing 12 where the front wall 12b and base support 38 meet. The door 20 is not limited to being pivotally mounted to the front wall 12b and may be slidably or otherwise mounted to the front wall 12b as long as the door 20 is moveable between the closed and open positions to provide access to the food cavity 14 through the toaster oven opening 22. The door 20 and toaster oven opening 22 are well known by one having ordinary skill in the art of a conventional toaster oven. The door 20 is preferably at least partially transparent such that a user is able to observe the food cavity 14 during toasting or heating to check the progress of the foodstuff, but is not so limited. In addition, the partially transparent door 20 permits identification of the contents in the food cavity 14 without opening the door 20.

Referring to FIGS. 2–3A and 6, in the preferred embodiments, the combination toaster oven and toaster appliance 10 includes a slot cover 24 that is movable between an extended position (FIG. 6) covering the slot 18 and a retracted position (FIGS. 2–3A) exposing the slot 18. The slot cover 24 is preferably constructed of a generally rigid material that is typically heat resistant and may be well-suited for insulating the food cavity 14. The slot cover 24 is preferably constructed of a metallic, sheet material and may include an insulating core, but is not so limited. The slot cover 24 may be constructed of a generally rigid, heat resistant polymeric material or nearly any other material that is able to take on the general shape of the slot cover 24 and withstand the normal operating conditions of the slot cover 24.

Figure 3:
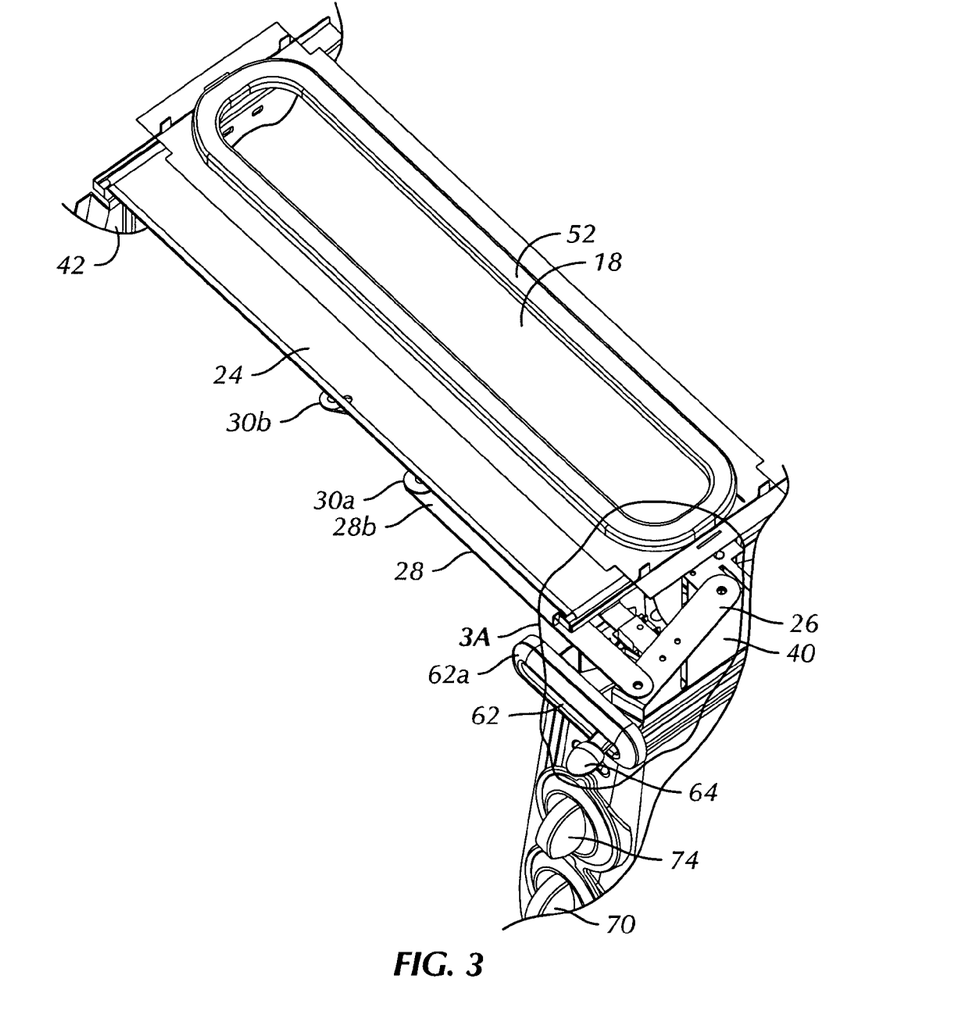
FIG. 3 is a top perspective, fragmentary view of the combination toaster oven and toaster appliance of FIG. 1 having portions of the housing and other components removed from view and a slot cover in a retracted position.
Figure 3A:
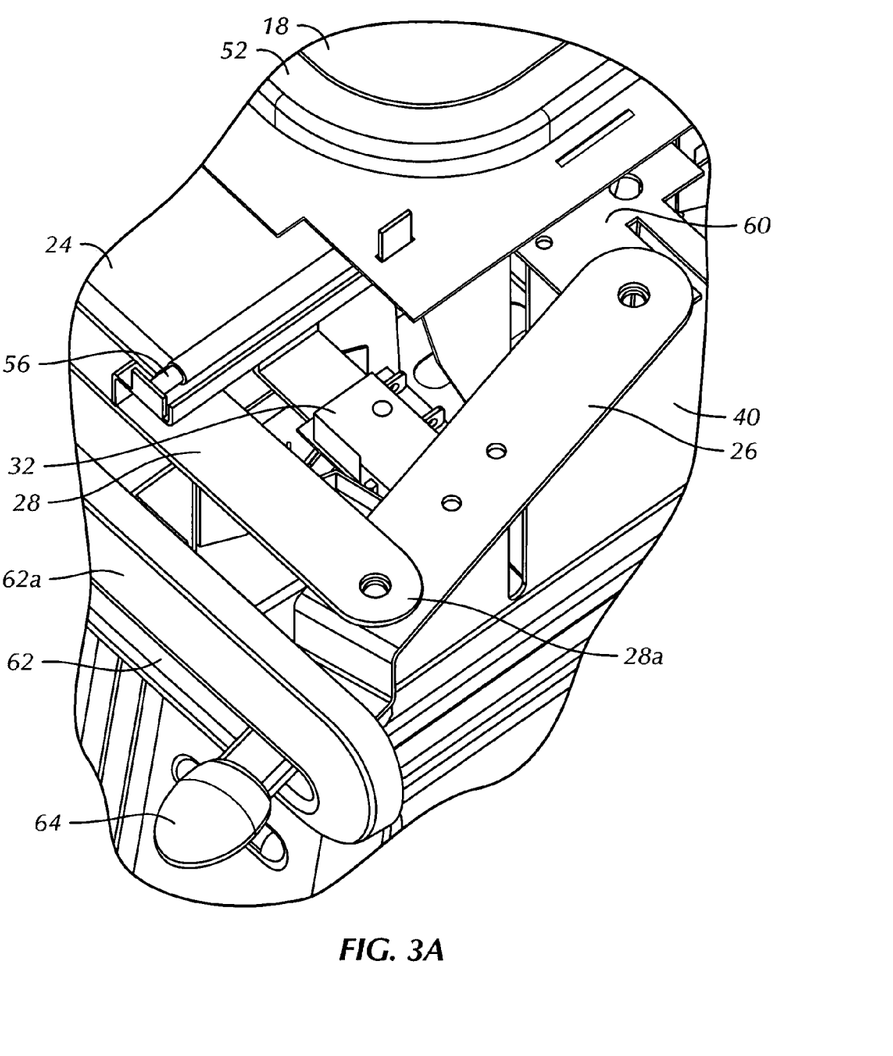
FIG. 3A is a greatly magnified top perspective, fragmentary view of the combination toaster oven and toaster appliance of FIG. 1 taken from within circle 3A of FIG. 3.

An arm 26 that is preferably movably mounted to the housing 12. The arm 26 is preferably movable between an oven position (FIG. 6) and a toast position (FIGS. 2–3A). The arm 26 is linked to the slot cover 24 such that when the arm 26 moves, the slot cover 24 also moves. Preferably, the slot cover 24 is in the extended position when the arm 26 is in the oven position and the slot cover 24 is in the retracted position when the arm 26 is in the toast position. That is, when the arm 26 is in the oven position, the slot cover 24 covers the slot 18 and when the arm 26 is in the toast position, the slot cover 24 is retracted and exposes the slot 18.

Referring to FIGS. 3 and 3A, in the preferred embodiments, the slot cover 24 is slidably mounted to the housing 12 to move to and between the extended and retracted positions. Specifically, the slot cover 24 is preferably slidably mounted to bars 56 that are fixed to the housing 12 proximate a top of the left and right support boards 40, 42. The slot cover 24 is guided in its movement to and between the extended and retracted positions by the bars 56. The slot cover 24 is not limited to being movably mounted to the housing 12 by the bars 56 and may be movably mounted to the housing 12 in nearly any manner that permits the slot cover 24 to move between the retracted and extended positions. For example, the slot cover 24 may be pivotally mounted to the housing 12 to move between the extended and retracted positions selectively covering or exposing the slot 18 or may be rotatably mounted to the housing 12.

Figure 6:
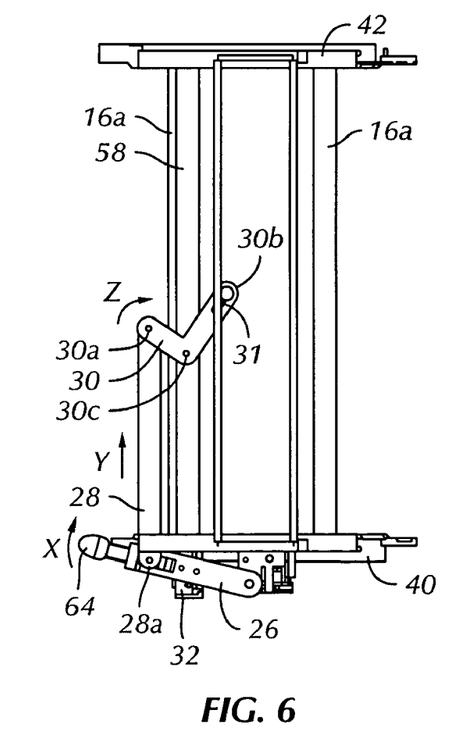
FIG. 6 is a top plan view of an arm, a slot cover, a sliding linkage, a pivoting linkage and other components of the combination toaster oven and toaster appliance of FIG. 1.

Referring to FIGS. 3, 3A and 6, a sliding linkage 28 having a first end 28a and a second end 28b is preferably mounted to the housing 12. The sliding linkage 28 is slidably mounted to the housing 12 in the preferred embodiments such that the first end 28a is attached to the arm 26. In the first preferred embodiment, at least one pivoting linkage 30 having a first joint 30a, a second joint 30b and a pivot joint 30c is mounted to the housing 12. The pivoting linkage 30 is preferably pivotally mounted to the housing 12 at the pivot joint 30c. The first joint 30a is preferably attached to the second end 28b of the sliding linkage 28 and the second joint 30b is preferably attached to the slot cover 24. The appliance 10 is not limited to the inclusion of a single pivoting linkage 30, as is shown in FIGS. 2, 3, 3A and 6, as will be described in greater detail below.

Referring to FIG. 6, in the preferred embodiments, the appliance 10 includes a cross support 58 that extends between the left and right support boards 40, 42 proximate the top of the food cavity 14. The at least one pivoting linkage 30 is pivotally mounted to the cross support 58 at the pivot joint 30c. The cross support 58, sliding linkage 28, and pivoting linkage 30 are preferably constructed of a generally rigid, heat-resistant material that is able to take on the general shape of these components and withstand the normal operating conditions of these components. The sliding linkage 28, pivoting linkage 30 and cross support 58 may be constructed of a metallic sheet material, but are not so limited. For example, the sliding and pivoting linkages 28, 30 and cross support 58 may be constructed of a rigid, heat resistant polymeric material. Multiple pivoting linkages 30 may be mounted to the cross support 58 at various locations to guide and drive the movement of the slot cover 24, as will be described in greater detail below. Multiple pivoting linkages 30 may also be mounted to other portions of the housing 12 to guide and drive the movement of the slot cover 24.

Referring to FIGS. 2–3A and 6, in the preferred embodiment, the arm 26 is pivotally mounted to a bracket 60 that is fixed to the left support board 40 of the housing 12. Pivoting the arm 26 from the toast position (FIGS. 2–3A) to the oven position (FIG. 6) preferably urges the sliding linkage 28 to pivot the pivoting linkage 30 and the slot cover 24 to move from the retracted position to the extended position covering the slot 18. Specifically, when the arm 26 is pivoted from the toast position to the oven position in the direction of an arrow X, the sliding linkage 28 slides generally parallel to the cross support 58 in the direction of an arrow Y and the pivoting linkage 30 pivots in the direction of an arrow Z about the pivot joint 30c. The pivoting linkage 30 preferably includes a slot 31 on its second joint 30b that engages a pivot button 24a on an underside of the slot cover 24. When the pivoting linkage 30 pivots about the pivot joint 30c, the pivot button 24 slides in the slot 31 such that the pivotal movement of the pivoting linkage 30 is translated into a linear or sliding movement of the slot cover 24, which is guided by the bars 56. The arm 26, sliding linkage 28, pivoting linkage 30 and slot cover 24 are not limited to the above-described arrangement but are preferably mechanically joined together or constructed in a manner that urges the slot cover 24 from the retracted to the extended position when the user intends to utilize the appliance 10 in an oven mode. For example, the appliance 10 may be provided with a remote control that remotely urges the slot cover 24 to and between the extended and retracted positions upon actuation of the remote control.

Figure 5:
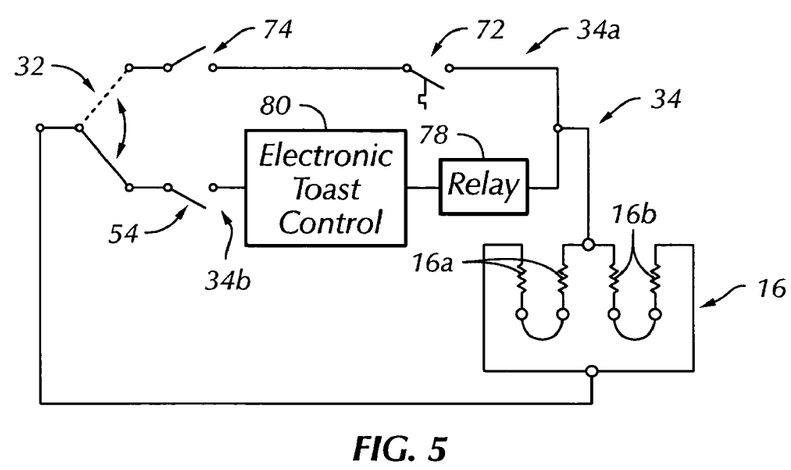
FIG. 5 is a schematic diagram of an electric circuit of the combination toaster oven and toaster appliance of FIG. 1.

Referring to FIGS. 3, 3A, 5 and 6, in the preferred embodiments, the combination toaster oven and toaster appliance 10 includes a selector switch 32 mounted to the housing 12 proximate the arm 26. The selector switch 32 is preferably utilized to actuate the appliance 10 between the oven mode and a toast mode. The arm 26 preferably actuates the selector switch 32 to the oven mode in the oven position and preferably actuates the selector switch 32 to the toast mode in the toast position. Referring specifically to FIG. 5, the selector switch 32 is actuable between the oven and toast modes to permit power to flow through an electric circuit 34 through an upper branch 34a (oven mode shown in dashed lines) or a lower branch 34b (toast mode shown in solid line). The selector switch 32 is preferably comprised of a microswitch 32 that toggles the electric circuit 34 between the oven and toast modes based upon the positioning of the arm 26, as will be described in greater detail below.

Referring to FIGS. 1–4, in the preferred embodiments, a slit 62 is preferably formed in the front wall 12b by a slit former 62a that is mounted to the front wall 12b. The arm 26 preferably includes a handle 64 that extends out of the housing 12 through the slit 62. The handle 64 preferably extends outwardly from the front wall 12b such that a user is able to manually engage the handle 64 to manipulate or move the arm 26 between the oven and toast positions. The appliance 10 is not limited to the inclusion of the slit 62, slit former 62a and/or handle 64 or to the above-described positioning of these components. For example, the user may remotely manipulate the slot cover 24 to and between the extended and retracted positions. However, the slit 62 and handle 64 are preferred for their simplicity in manipulating the arm 26 to and between the toast and oven positions, which urges the slot cover 24 to and between the extended and retracted positions.

Referring to FIGS. 2, 3, 6 and 7, in the preferred embodiment, the slot cover 24 generally prevents insertion of a foodstuff into the food cavity 14 through the slot 18 and onto the carriage 36 in the extended position and permits insertion of the foodstuff into the food cavity 14 through the slot 18 for placement on the carriage 36 in the retracted position. Specifically, the slot 18 is exposed such that foodstuff may be inserted into the slot 18 and onto the carriage 36 when the slot cover 24 is in the retracted position. In contrast, when the slot cover 24 is in the extended position, the slot 18 is covered and a foodstuff may typically not be inserted into the slot 18. The carriage 36 is preferably in alignment with the slot 18 during its movement between the loading and toast positions such that the foodstuff is generally centrally located in the toast cavity 14 in a vertical direction regardless of whether the carriage 36 is in the loading or toast positions.

Figure 4:
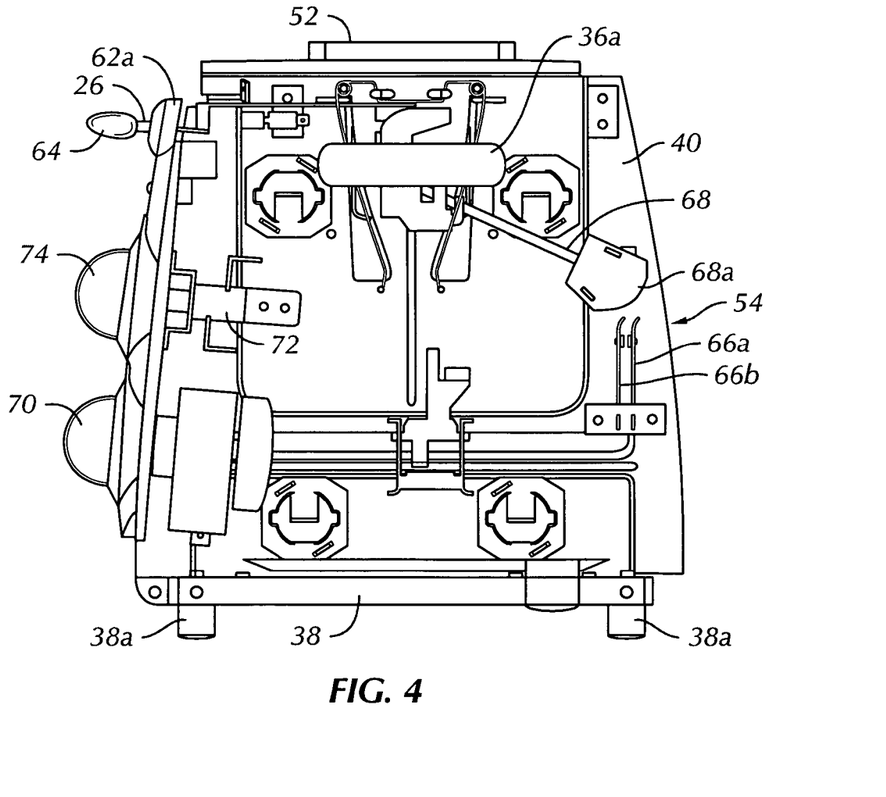
FIG. 4 is a left-side elevational view of the combination toaster oven and toaster appliance of FIG. 1 having portions of the housing and other components removed from view.

Referring to FIGS. 2, 4 and 5, in the preferred embodiment, the appliance 10 includes a toast switch 54 mounted to the housing 12. The toast switch 54 is actuated or closed when the carriage 36 is in the toast position partially closing the lower branch 34b and potentially permitting power to flow to the heating elements 16a, 16b for heating the food cavity 14. The toast switch 54 is preferably comprised of a pair of metallic tabs 66a, 66b and an actuating arm 68 having a cam block 68a on its end. The actuating arm 68 is movably mounted to the carriage 36 such that the actuating arm 68 and attached cam block 68a pivots as the carriage 36 moves between the loading and toast positions. Specifically, when the carriage 36 is in the loading position, the cam block 68a is pivoted such that it does not contact the metallic tabs 66a, 66b. When the carriage 36 is moved into the toast position, the cam block 68a pivots such that the block 68a contacts the first metallic tab 66a and pushes the tab 66a into the second metallic tab 68b to close the toast switch 54 such that the electric circuit 34 is closed and power is provided to the heating elements 16a, 16b. The combination toaster oven and toaster appliance 10 is not limited to the above-described toast switch 54 and may include nearly any switch that closes the electric circuit 34 when the carriage 36 moves to the toast position as would be known by one having ordinary skill in the art.

Referring to FIGS. 1–3, 4 and 5, in the preferred embodiment, a timing knob 70 is mounted to the housing 12. The timing knob 70 is preferably rotatably mounted to the housing 12 to modify a toasting time defining an amount of time power is provided to the heating elements 16a, 16b. Power is preferably cut to the heating elements 16a, 16b at the conclusion of the toasting time by opening the lower branch 34b when the allotted time is complete. The timing knob 70 is preferably rotatable to various positions to set various time values for toasting. For example, the timing knob 70 may be labeled light, medium and dark to set a toasting time that results in light, medium or dark toasting of a slice of bread or pastry. The timing knob 70 is preferably in series in the electric circuit 34 with respect to the toast switch 54 and permits power to flow to the heating elements 16a, 16b when the toast switch 54 is actuated, the carriage 36 is in the toast position and the selector switch 32 is positioned in the toast mode (solid line in FIG. 5). The operation and construction of the timing knob 70 and toast switch 54 is common in the toasting art as will be understood by one having ordinary skill in the art. In addition, one having ordinary skill in the art will be aware of various other structures and methods for controlling a toasting cycle that could be utilized with the combination toaster oven and toaster appliance 10, for example, the timing knob 70 may be comprised of a digital timing control that permits a user to directly select a heating or toasting time.

The timing knob 70 is preferably in communication with an electronic toast control 80 that is manipulated by the timing knob 70 to set a toasting time. The electronic toast control 80 preferably commences a timed toasting cycle when the toast switch 54 is closed and the selector switch 32 is in the toast mode. The electronic toast control 80 preferably automatically opens the lower branch 34b or cuts power to the heating elements 16a, 16b to end the toasting cycle at the conclusion of the toasting time. The appliance 10 is not limited to the inclusion of electronic toast control 80 that controls the timed toasting cycle and may be controlled by a sensor that senses a temperature of a toasting foodstuff or optically measures a darkness of a toasting foodstuff and cuts power to the heating elements 16a, 16b by opening the lower branch 34b when a predetermined value is reached, such as a surface temperature of the slice of bread or a dark surface appearance on a slice of bread.

Referring to FIGS. 1, 2 and 5, in the preferred embodiment, an adjustable bi-metal thermostat 72 is mounted to the housing 12 and positioned in the upper branch 34a of the electric circuit 34. The bi-metal thermostat 72 is preferably mounted in or adjacent to the food cavity 14 such that the thermostat 72 is able to measure an accurate temperature of the food cavity 14 during operation. The appliance 10 is not limited to inclusion of a bi-metal thermostat 72 and may include nearly any type of temperature measuring device or other thermostat that is able to measure the temperature of the food cavity 14. The bi-metal thermostat 72 is preferred because the bi-metal thermostat 72 is adjustable such that the upper branch 34 of the electric circuit 34 is opened and power is cut to the heating elements 16a, 16b when a predetermined temperature is reached in the food cavity 14, as will be described in greater detail below. The bi-metal thermostat 72 preferably operates to control the temperature within the food cavity 14 when the selector switch 32 is in the oven mode, the arm 26 is in the oven position and the slot cover 24 is in the extended position covering the slot 18, as will also be described in greater detail below.

A temperature knob 74 is preferably mounted to the front wall 12b of the housing 12, is positioned in series in the upper branch 34a with the bi-metal thermostat 72 and is rotatable between an off position and a series of set temperatures. The temperature knob 74 is preferably in communication with the bi-metal thermostat 72 such that positioning the temperature knob 74 at a first set temperature sets a first trip temperature of the adjustable bi-metal thermostat 72. For example, the temperature knob 74 may be rotatable through various positions to adjust the trip temperature between two hundred degrees Fahrenheit (200° F.) and five hundred degrees Fahrenheit (500° F.). The temperature knob 74 is also preferably rotatable to an off position, which opens the upper branch 34a. The temperature knob 74 is not limited to being rotatably mounted to the front wall 12b or to the above-listed temperature range. For example, the temperature knob 74 may be comprised of a digital control that permits a user to adjust the trip temperature of the bi-metal thermostat 72 anywhere in the temperature range of zero and six hundred degrees Fahrenheit (0–600° F.) or nearly any other temperature. The temperature knob 74 preferably permits modification of the trip temperature of the bi-metal thermostat 72 in a range of temperatures such that a cooking temperature in the food cavity 14 is controllable by a user when the appliance 10 is being utilized in an oven mode.

In the preferred embodiment, the temperature knob 74 is movable between an off position and a high temperature position. The temperature knob 74 is open in the off position such that power does not flow through the upper branch 34a, including the bi-metal thermostat 72, and the bi-metal thermostat 72 is typically closed and permits power to flow through the upper branch 34a when the temperature knob 74 is in the high temperature position, specifically, when the temperature in the food cavity 14 is below a high trip temperature. The temperature knob 74, which is in communication with the bi-metal thermostat 72, is preferably in series the bi-metal thermostat 72 in the upper branch 34a such that both the selector switch 32 must be in the oven mode and bi-metal thermostat 72 must be closed for power to flow to the heating elements 16a, 16b in the oven mode.

Referring to FIGS. 1–6, in operation, the combination toaster oven and toaster appliance 10 may be utilized in the oven mode or the toast mode. In the oven mode, the appliance 10 is utilized in the typical manner of a toaster oven and in the toast mode, the appliance is utilized in the typical manner of a conventional toaster, each of which are known by one having ordinary skill in the art. The appliance 10 combines these two common kitchen appliances into a single appliance for versatility and to reduce the amount of kitchen countertop space occupied by the appliance 10.

Figure 8:
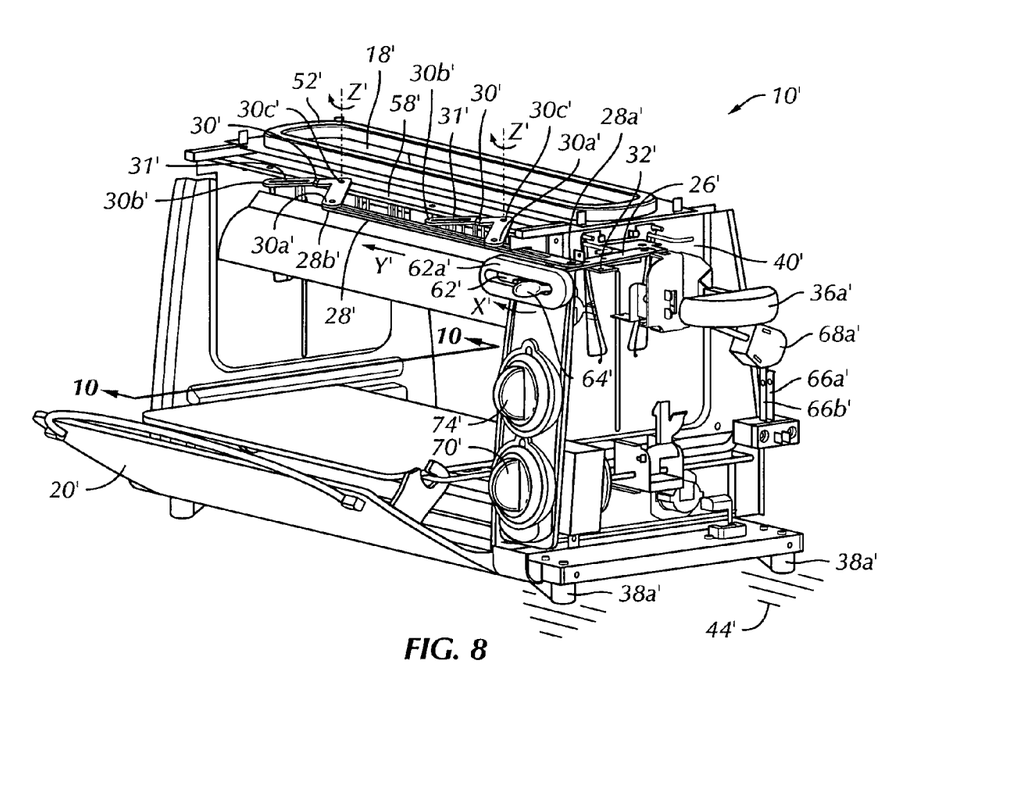
FIG. 8 is a front perspective view of the combination toaster oven and toaster appliance in accordance with a second preferred embodiment of the present invention having portions of a housing and other components removed from view.
Figure 9:
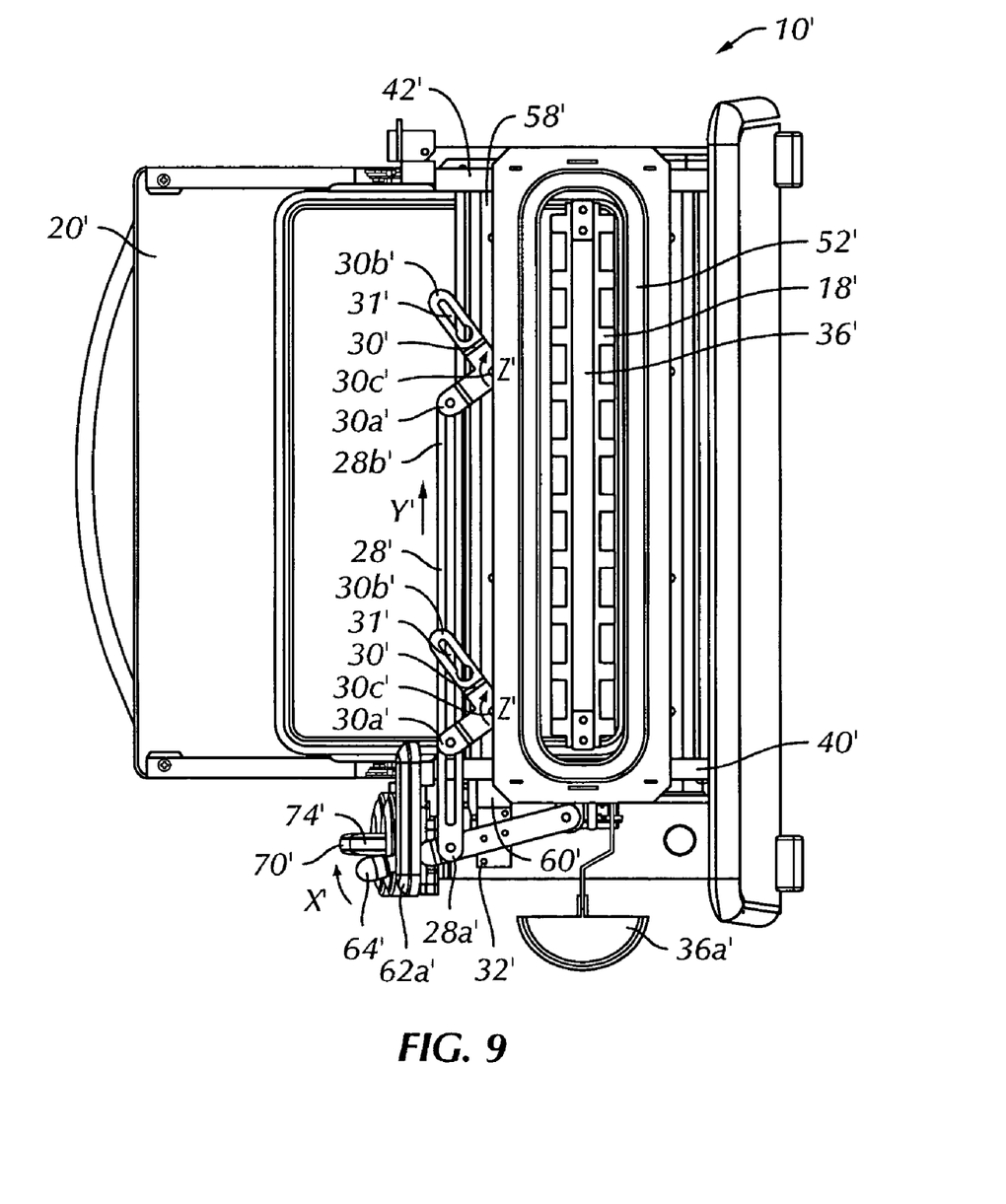
FIG. 9 is a top plan view of the combination toaster oven and toaster appliance of FIG. 8 having portions of a housing and other components removed from view.
Figure 10:
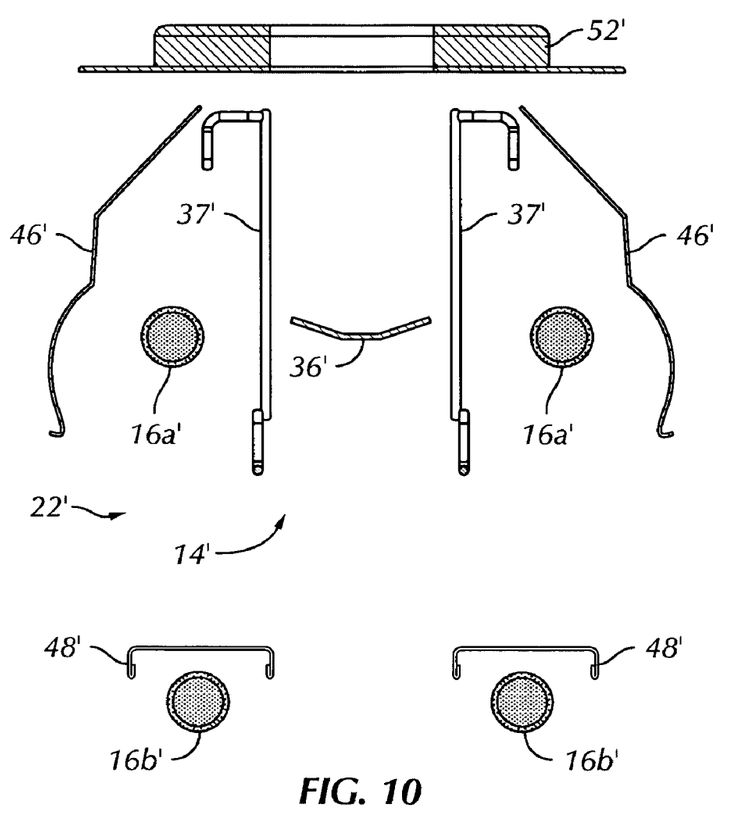
FIG. 10 is a partial cross-sectional view of the combination toaster oven and toaster appliance of FIG. 8, taken along line 10—10 of FIG. 8.

Referring to FIGS. 8–10, a second preferred embodiment of the combination toaster oven and toaster appliance 10' is shown, which is structurally and functionally similar to the appliance 10 of the first preferred embodiment. The appliance 10' of the second preferred embodiment is described using like reference numerals to indicate like elements and a prime symbol (') to indicate the elements of the second preferred embodiment. The structure of the second preferred embodiment of the appliance 10' is described below.

Referring to FIGS. 8 and 9, in the second preferred embodiment, the appliance 10' includes two pivoting linkages 30' mounted proximate left and right ends of the slot cover (not shown). The two pivoting linkages 30' provide additional stability for moving the slot cover to and between the retracted position and the extended position. Specifically, the inclusion of two pivoting linkages 30' may reduce binding or jamming of the slot cover. The two pivoting linkages 30' are each preferably, pivotally mounted to the cross support 58', but are not so limited. For example, the pivoting linkages 30' may be pivotally mounted to a top end of the reflector shields 46' or may be otherwise mounted to the housing 12'. The pivoting linkage 30' proximate the right-side of the appliance 10' is preferably mounted to the second end 28b' of the sliding linkage 28' at its first joint 30a' and the pivoting linkage 30' proximate the right-side of the appliance is preferably mounted proximate the first joint 28a' of the sliding linkage 28' at its first joint 30a'. The second joints 30b' are preferably mounted proximate right and left-sides of the slot cover, respectively.

The appliance 10' of the second preferred embodiment also preferably includes an intermediate linkage 29 that is mounted between the first joint 28a' of the sliding linkage 28' and the arm 26'. The intermediate linkage 29 is preferably mounted to the arm 26' at a connection joint 29a that permits pivoting between the arm 26' and the intermediate linkage 29. The intermediate linkage 29 transmits the pivotal movement of the arm 26' to the sliding linkage 28' to reduce any binding that may occur to the sliding linkage 28'. The intermediate arm 29 is preferably constructed of a material that is generally heat resistant and is able to take on the general shape of the intermediate arm 29. The intermediate arm 29 is preferably constructed of a same material as the arm 26', sliding linkage 28' and the pivoting linkage 30', but is not so limited. The movement of the sliding linkage 28' is preferably exclusively linear when the arm 26' moves between the toast and oven positions. The intermediate arm 29 is not required for the operation of the appliance 10' but is preferred to limit movement of the sliding linkage 28' to generally linear movement.

Referring to FIG. 10, in the second preferred embodiment, the front and rear reflector shields 46' each have an arcuate or curved surface that is concave with respect to the upper heating elements 16a'. The arcuate shape of the reflector shields 46' reflects heat and radiation energy emitted from the upper heating elements 16a' toward a central portion of the food cavity 14' and provides clearance for insertion of a foodstuff through the slot 18' or through the toaster oven opening 22'. The arcuate shape of the reflector shields 46' is optimized to maximize the reflection of radiation heat energy toward the food cavity 14' and any foodstuff therein for heating the foodstuff. The reflector shields 46' are not limited to the specific disclosed shape and may have other shapes that urge radiation heat energy or other heat energy toward the food cavity 14', for example, the shape of the reflector shields 46 of the first preferred embodiment. However, the reflector shields 46' of the second preferred embodiment are designed to have a nearly identical arcuate shape such that the front and rear reflector shields 46' are interchangeable, thereby reducing part count of the appliance 10' and simplifying the design.

Referring to FIGS. 1–10, to operate the appliance 10, 10' in the oven mode, the door 20 is opened and foodstuff is inserted for cooking, baking, toasting or other heating into the food cavity 14 through the toaster oven opening 22 in the housing 12. The handle 64 is grasped and the arm 26 is moved into the oven position (dashed line in FIG. 5), actuating the appliance 10 into the oven mode and cutting any power flow through the lower branch 34b. When the arm 26 is moved to the oven position in the direction of the arrow X, the sliding linkage 28 slides in the direction of the arrow Y, the pivoting linkage 30 pivots in the direction of the arrow Z and the slot cover 24 moves into the extended position, covering the slot 18. The slot cover 24 preferably prevents objects from entering the slot 18 in the oven mode and insulates the slot 18 such that heat is retained in the food cavity 14 for heating the foodstuff. In the oven position, the arm 26 preferably permits power to flow through upper branch 34a through the selector switch 32. The temperature knob 74 is rotated from the off position to one of the set temperatures to set a trip temperature of the bi-metal thermostat 72. Power is provided to the heating elements 16a, 16b and the foodstuff is heated or cooked in the food cavity 14. The reflector shields 46 reflect radiation heat toward the foodstuff, which is typically resting on a rack 76 in the food cavity 14, and the shield boards 48 preferably deflect crumbs or larger portions of foodstuff from directly contacting the lower heating elements 16b and permit heat to flow toward the center of the food cavity 14 through the holes. When the temperature of the food cavity 14 reaches the set temperature, the bi-metal thermostat 72 opens and power is cut to the heating elements 16a, 16b such that the temperature in the food cavity 14 is maintained in close proximity to the set temperature. The temperature knob 74 is rotated to the off position, opening the upper branch 34a and the cooked foodstuff is removed from the food cavity 14 when the foodstuff is cooked to a desired level, which can be observed through the door 20. The food cavity 14 may be pre-heated prior to inserting the foodstuff into the toaster oven opening 22, as would be obvious to one having ordinary skill in the art. The appliance 10' operates in a nearly identical manner in the oven mode to the appliance 10 of the first preferred embodiment, with the exception of the pair of pivoting joints 30a' urging the slot cover from the retracted position to the extended position when the arm 26' is pivoted in the direction of the arrow X', as would also be obvious to one having ordinary skill in the art.

In the toast mode, the arm 26 is pivoted to the toast position in a direction of the arrow X such that the sliding linkage 28 and pivoting linkage 30 move in the opposite directions of the arrows Y, Z urging the slot cover 24 from the extended position to the retracted position to expose the slot 18. The foodstuff is inserted into the slot 18 such that it is positioned on the carriage 36 in the loading position. The timing knob 70 is rotated to select a desired toasting time or a desired toast darkness, which sets a toasting or heating time in the electronic toast control 80. The toast handle 36a is depressed to move the carriage 36 from the loading position to the toast position where the foodstuff is preferably located in the food cavity 14 below the slot 18. Movement of the carriage 36 into the toast position causes the actuating arm 68 and cam block 68a to pivot such that the cam block 68a contacts the first tab 66a urging the first tab 66a into the second tab 66b closing the toast switch 54. When the toast switch 54 is closed and the selector switch 32 is actuated to the toast move (solid line in FIG. 5) by the arm 26, the electronic toast control 80 begins the timed toasting cycle and power flows to the heating elements 16a, 16b through the toast switch 54, through the lower branch 34b into the heating elements 16a, 16b. At the end of the toasting cycle, the electronic toast control 80 opens the lower branch 34b, thereby cutting power to the heating elements 16a, 16b. The carriage 36 may automatically move from the toast position to the loading position to permit a user to remove the toasted foodstuff from the slot 18 or may remain in the food cavity 14 until a user manually moves the carriage 36 from the toast position to the loading position using the toast handle 36a. The heating elements 16a, 16b are preferably not powered until the carriage 36 is moved from the toast position to the loading position such that the electronic toast control 80 is reset for another toasting cycle. Again, the appliance 10' of the second preferred embodiment operates in a nearly identical manner in the toast mode to the appliance 10 of the first preferred embodiment, with the exception of the pair of pivoting joints 30a' urging the slot cover from the extended position to the retracted position when the arm 26' is pivoted in the opposite direction of the arrow X', as would also be obvious to one having ordinary skill in the art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

We claim:

1. A combination toaster oven and toaster appliance for cooking and heating foodstuff, the combination toaster oven and toaster appliance comprising:
   a housing defining a food cavity therein, the housing including a top wall and a front wall;
   a heating element mounted in the housing for heating the food cavity;
   at least one slot in the top wall;
   a door movably mounted to the front wall;
   a toaster oven opening in the front wall providing access to the food cavity, the door movable between a closed position wherein the door covers the toaster oven opening and an open position wherein the door exposes the toaster oven opening and food cavity; and
   a slot cover movable between an extended position covering the at least one slot and a retracted position exposing the at least one slot.

2. The combination toaster oven and toaster appliance of claim 1 further comprising:
   an arm movably mounted to the housing, the arm being movable between an oven position and a toast position, the arm being linked to the slot cover such that the slot cover is in the extended position when the arm is in the oven position and the slot cover is in the retracted position when the arm is in the toast position.

3. The combination toaster oven and toaster appliance of claim 2 further comprising:
   a sliding linkage having a first end and a second end, the sliding linkage being slidably mounted to the housing, the first end being attached to the arm; and
   at least one pivoting linkage having a first joint, a second joint and a pivot joint, the at least one pivoting linkage being pivotally mounted to the housing at the pivot joint, the first joint being attached to the second end of the sliding linkage and the second joint being attached to the slot cover.

4. The combination toaster oven and toaster appliance of claim 3 wherein the arm is pivotably mounted to the housing and pivoting the arm from the toast position to the oven position causes the sliding linkage to move, the at least one pivoting linkage to pivot and the slot cover to move from the retracted position to the extended position covering the at least one slot.

5. The combination toaster oven and toaster appliance of claim 2 further comprising:
   a selector switch mounted in the housing, the arm actuating the selector switch in the oven position to close an upper branch of an electric circuit of the appliance, the arm actuating the selector switch to open the upper branch in the toast position.

6. The combination toaster oven and toaster appliance of claim 1 further comprising:
   a carriage movably mounted in the housing, the carriage being movable between a toast position and a loading position, the carriage being biased toward the loading position, the carriage actuating a toast switch in the toast position to commence a timed toasting cycle in a toast mode wherein the heating element is powered to heat the food cavity.

7. The combination toaster oven and toaster appliance of claim 1 wherein the heating element is comprised of a first pair of upper heating tubes and a second pair of lower heating tubes, the upper heating tubes associated with a pair of reflector shields that reflect radiation heat energy from the upper heating tubes toward a central portion of the food cavity, the lower heating tubes associated with a pair of shield boards that are positioned between the lower heating tubes and the central portion of the food cavity, the shield boards including holes therein to permit radiation heat energy from the lower heating tubes to travel toward the central portion of the food cavity, the shield boards also generally deflecting relatively large pieces of foodstuff from coming into direct contact with the lower heating tubes.

8. A combination toaster oven and toaster appliance for cooking and heating foodstuff, the combination toaster oven and toaster appliance comprising:
   a housing having a top wall, a front wall and defining a food cavity therein;
   a slot in the top wall;
   a slot cover movable between an extended position covering the slot and a retracted position exposing the slot;
   a toaster oven opening in the front wall providing access to the food cavity; and
   an arm movably mounted to and extending from the housing, the arm movable between an oven position and a toast position, the arm being linked to the slot cover such that the slot cover is in the extended position when the arm is in the oven position and the slot cover is in the retracted position when the arm is in the toast position.

9. The combination toaster oven and toaster appliance of claim 8 wherein the arm is pivotally mounted to the housing, the housing including a front wall having a slit therein, the arm including a handle portion that extends out of the housing through the slit.

10. The combination toaster oven and toaster appliance of claim 8 further comprising:
    a carriage movably mounted to the housing, the carriage being movable between a loading position and a toast position, the slot cover generally preventing insertion of the foodstuff into the food cavity and onto the carriage in the extended position and generally permitting insertion of the foodstuff into the food cavity for placement on the carriage in the retracted position.

11. A control system for a combination toaster oven and toaster appliance comprising:
a housing having a top wall and a front wall, the housing defining a food cavity;
a heating element for heating the food cavity;
a slot in the top wall;
a toaster oven opening in the front wall and a door movably mounted to the front wall to selectively close and expose the toaster oven opening;
a slot cover movably mounted to the housing, the slot cover being movable between an extended position covering the slot and a retracted position exposing the slot;
an arm movably mounted to the housing, the arm movable between an oven position and a toast position, the slot cover being in the extended position when the arm is in the oven position;
a carriage in alignment with the slot and being movable between a loading position and a toast position;
a selector switch mounted to the housing proximate the arm, the selector switch actuating the appliance to a toast mode when the arm is in the toast position and actuating the appliance to an oven mode when the arm is in the oven position.

12. The control system of claim 11 wherein the selector switch is a microswitch.

13. The control system of claim 11 further comprising:
a toast switch mounted to the housing, the toast switch being actuated when the carriage is in the toast position, power flowing through the toast switch to the heating element when the appliance is in the toast mode and an electronic toast control is running a timed toasting cycle for heating the food cavity.

14. The control system of claim 13 further comprising:
a timing knob mounted to the housing, the timing knob being in communication with the electronic toast control and being rotatable to modify a toasting time defining an amount of time power is provided to the heating element, power being cut to the heating element at a conclusion of the toasting time.

15. The control system of claim 11 further comprising:
an adjustable bi-metal thermostat mounted to the housing; and
a temperature knob rotatably mounted to the housing and rotatable between an off position and a series of set temperature positions, the temperature knob in communication with the adjustable bi-metal thermostat such that positioning the temperature knob at a first set temperature sets a first trip temperature of the adjustable bi-metal thermostat, when the arm is in the oven position and the temperature knob is rotated to one of the set temperature positions, power being provided to the heating element through an upper branch of an electric circuit for heating the food cavity, the adjustable bi-metal thermostat opening the upper branch and cutting power to the heating element when the temperature of the food cavity reaches the first set temperature.

16. The control system of claim 11 further comprising:
a toast switch mounted to the housing, the toast switch being responsive to a position of the carriage.

17. The control system of claim 16 further comprising:
a temperature knob mounted to the housing; and
a timing knob mounted to the housing, the timing knob being in communication with an electronic toast control, the electronic toast control being in series in an electric circuit of the appliance with the toast switch, the temperature knob being in parallel relative to the timing knob.

18. A combination toaster oven and toaster appliance for cooking and heating foodstuff, the combination toaster oven and toaster appliance comprising:
a housing defining a food cavity therein, the housing including a top wall, a side wall and a front wall;
a heating element mounted in the housing for heating the food cavity;
an arm movably mounted to the housing, the arm being movable between an oven position and a toast position;
an selector switch mounted to the housing proximate the arm, the selector switch actuating the appliance to an oven mode when the arm is in the oven position and actuating the appliance to a toast mode when the arm is in the toast position;
a slot cover movably mounted to the housing, the slot cover linked to the arm and being movable between an extended position covering a slot in the top wall and a retracted position exposing the slot; and
a temperature knob mounted to the housing, the temperature knob being movable between an off position and a high temperature position, the temperature knob opening an upper branch of an electric circuit of the appliance in the off position and closing the upper branch in the high temperature position.

19. The combination toaster oven and toaster appliance of claim 18 wherein the temperature knob is linked to a bi-metal thermostat to modify a trip temperature of the bi-metal thermostat, the bi-metal thermostat opening the upper branch when the temperature knob is in the off position such that power does not flow through the upper branch.

20. The combination toaster oven and toaster appliance of claim 18 further comprising:
a toast switch mounted to the housing;
a carriage movably mounted to a support board of the housing, the carriage being movable between a toast position and a loading position, the carriage closing the toast switch in the toast position, a timed toasting cycle commencing when the carriage is in the toast position, the selector switch actuates the appliance to the toast mode and an electronic toast control is running a timed toasting cycle wherein the heating element is powered to heat the food cavity, the toast switch being in parallel with the bi-metal thermostat in the electric circuit.

21. The combination toaster oven and toaster appliance of claim 18 further comprising:
a sliding linkage mounted to the arm; and
at least one pivoting linkage mounted between the sliding linkage and the slot cover, the sliding linkage and at least one pivoting linkage mechanically translating the movement of the arm between the oven position and toast position to move the slot cover between the extended position and retracted position, respectively.

* * * * *